April 28, 1964    K. KROPP ETAL    3,130,634
PHOTOMICROGRAPHIC EQUIPMENTS
Filed May 31, 1962    2 Sheets-Sheet 1

INVENTORS
Karl Kropp
Hans Thillendorfer

BY

Michael J. Striker
ATTORNEY

United States Patent Office 3,130,634
Patented Apr. 28, 1964

3,130,634
PHOTOMICROGRAPHIC EQUIPMENTS
Earl Kropp, Vienna, and Hans Millendorfer, Wiener Neudorf, Austria, assignors to C. Reichert Optische Werke Aktiengesellschaft, Vienna, Austria
Filed May 31, 1962, Ser. No. 199,099
Claims priority, application Austria June 7, 1961
8 Claims. (Cl. 88—24)

Photomicrographic equipments are known in which exposure time is automatically controlled. These photomicrographic equipments work according to the following principle of light measurement frequently used in photographic technique: a light-sensitive element, which receives the light beam which comes from a picture section or from the whole picture, produces a current proportional directly or indirectly to the integral mean value of the illumination strength in the picture section, which—beginning at the same time as the exposure—charges a condenser. When the voltage across the condenser attains a specified value, then with the aid of an automatic electronic device the exposure is ended.

The described principle of automatic exposure control has proved itself well in many cases which are not connected with photomicrography e.g. in automatic copying equipment. In the special case of photomicrography the following considerations must be kept in mind to avoid a severe limitation of its utility by the danger of faulty exposures:

(1) Because the automatic mechanism ends the exposure upon the attainment of a light quantity which is constant for the photo-emulsion in use independently of the exposure time necessary therefor, the light quantity required by the emulsion for an optimum exposure must be constant for all exposure times. This requirement is satisfied with short exposure times for all photo-emulsions, but with longer exposure times there are—especially with colour films—considerable deviations. These deviations which, with some photo-emulsions can be noticeable even with exposure times of 1–2 seconds, are comprehended under the term "Schwarzschild effect" or, more descriptively, "reciprocity failure."

(2) The colour rendering of the reproduction of the subject is different with the usual photo-emulsion, even with optimum exposure, with different exposure times—especially with the longer ones—because, briefly, the response curves of the three colour-emulsion-components are different, pronouncedly so once reciprocity failure appears. The automatic mechanism mentioned excludes the use of a specified constant exposure time for a series of shots, which should be similar especially in colour reproduction.

(3) A correction of the automatic mechanism in the cases in which the requirements for optimum operation of the automatic mechanism are not achieved is only possible, with the described photomicrographic equipments, by trial and error.

That means therefore, that even in colour photomicrography where it is especially desirable to obtain simplification of exposure control by means of automatic mechanism, the use of such mechanism may give faulty exposures. One thinks for example of rapidly growing tendency towards colour photomicrography with relatively long exposure times, for which the colour film producers specify lengthening factors for the exposure time of several exposure steps, and kinephotomicrography for which, conversely, exposure times are given corresponding to the frame speeds.

The present invention, which has for its object to minimize all these difficulties, concerns an arrangement for exposure time control for photomicrography and kinephotomicrography with an electro-magnetic shutter, which is opened and shut by an electric timing device defining the exposure time and a light sensitive element which lies in a ray path branched from the photo ray path, is characterised in this, that a first light weakening device lies in front of the light branching and that a second light weakening device lies between the light branching and the light sensitive element, wherein the second light weakening device is so coupled with the time switch of the electric timing device that the quotient from its light transmission T and the exposure time $t$ readable from a time scale of the timing device is constant (K) and that a servo-mechanism shifts selectively one of the two light weakening devices (while the other is held fast), until the given illumination strength ($B_0$) is attained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
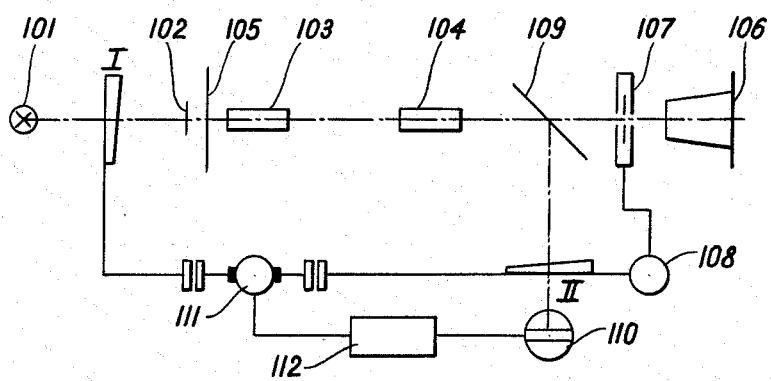
FIG. 1 is a schematic diagram of a photomicrographic arrangement according to the invention.

The function of the equipment briefly defined further above may be seen at its simplest by reference to the schematic diagram of FIG. 1 in which is shown a microscope having source 101, a condenser 102, an objective 103, and an eye piece 104. An object 105 is to be photographed on a photo plate 106. An electromagnetic shutter 107 is controlled from a timing device 108 which itself is coupled with a light weakening device II mounted between a beam splitter 109 and a light sensitive element 110. Anywhere between the parts 101 and 109 a light weakening device I is inserted. A servo motor 111 receives its signals via an amplifier 112 from the element 110 and at choice may be coupled on to either of the devices I, II. If the illumination strength $B_0$ on the light sensitive element 110 is proportional to that $B_p$ on the photo plate: $B_0 = B_p.G.T$. The proportionality factor G is given by the geometry of the beam splitting i.e. by the different transmissions from 109 to 106 and from 109 to 110 while T represents the transparency of the light weakening device II. Because however according to the invention the quotient of T and the time $t$ set by means of the timing device 108 is a constant K, $T = Kt$ and therefore $B_0 = B_p.G.K.t$ otherwise stated $B_p t = B_0/G.K$ or, if a new constant $C = B_0/G.K$ then $B_p.t = C$. This means that the right exposure of the photo plate is always set and indeed this can happen where one couples 111 to II or to I as the case may be, while one either (a) Allows the device II to operate automatically to a balance with the timing device through the servo motor while the adjustment of I is held fast and therefore with a predetermined illumination intensity sets in the exposure time automatically;

or conversely (b) Lets the device I operate automatically to a balance with the timing device 108 while the setting of II is held fast and therefore sets in the illumination intensity automatically with a previously chosen exposure time.

One will choose variant (a) for quick routine shots with which quality is of no particular importance, and especially with relatively short exposure times, while variant (b) is especially suitable with colour shots and in kinephotomicrography, because in both cases predetermined and constant exposure times are desirable, for one thing on account of the desired accuracy of colour, for another thing on account of the instrumental constant as already set out above.

In a specially suitable form of the invention the light sensitive element lies in a bridge circuit, whose zero point determines the constant illumination strength $B_0$, to which through servo mechanism is set.

The proportionality factor C can be altered for taking into account the film speed and other constant factors dependent on the exposure time. This can occur by alteration of $B_0$, of G or of K.

An alteration of $B_0$ is effected according to the invention in such manner that the bridge zero point can be set for taking into account constant factors altering the exposure time, notably the film speed. An alteration of G is effected likewise according to the invention in this manner, that an additional (third) light weakening device is provided in front of the light sensitive element for taking into account constant factors altering the exposure time, notably the film speed. An alteration of K finally is possible by alteration of the coupling between light weakening device II and the timing device.

However, C is, especially in the case of color films, also dependent on exposure time because, according to Schwarzschild, particularly for rather long exposures, $B \cdot t$ is not constant, but $B \cdot t^p =$ constant. The exponent $p$ which thus is characteristic of the so-called Schwarzschild-effect may assume values ranging between .6 and .95 as experience has shown.

For taking into account this effect therefore the longer exposure times must be extended yet further. One could, because the exposure time set in by the automatic mechanism is readable on the timing device, adjust the latter correspondingly for the necessary correction. It is however simpler, if reciprocity failure is taken into account automatically. This occurs according to the invention in this manner, that the time-determining resistances and/or condensers of the electronic timing device can be increased individually, or collectively in groups, for taking into account the extension factors of the photo-emulsion dependent on the exposure time. One can therefore adjust the exposure control equipment once for all times for the photo-emulsion used, whose $p$ is known, and then leave the taking into account of reciprocity failure to the automatic mechanism.

An arrangement of the invention consists further in this, that the time switch, after switching out the light sensitive, element and/or the servo mechanism, additionally is coupled with a fourth light weakening device in the ray path of a comparison field reflected into the picture field of a viewing tube for photometer purposes, in such manner, that each adjustment of the fourth light weakening device effects a simultaneous adjustment of the time switch in the sense of a constancy of the product of the illumination strength comparison field and the exposure time shown on the time switch. The numerical value of the product is dependent upon the constant factors altering the exposure time, as e.g. the film speed, and is altered by alteration of the coupling between the time switch and the fourth light weakening device or by alteration of the brightness of the comparison ray path. In this manner the photometer can be drawn near for a measurement of the subject details made in the picture, in cases in which an integrated exposure measurement appears undesirable. Then with the measurement the setting of the time switch also results. Because the product of the brightness of the comparison field and the exposure time set in is constant, with equality of the comparison field and the picture field, therefore with balanced photometer, the product of the illumination strength in the film plane of the camera and the exposure time set in is also constant, or, with the setting in of the extension factors, has the optimum value for the respective exposure time.

Figures 3, 4:
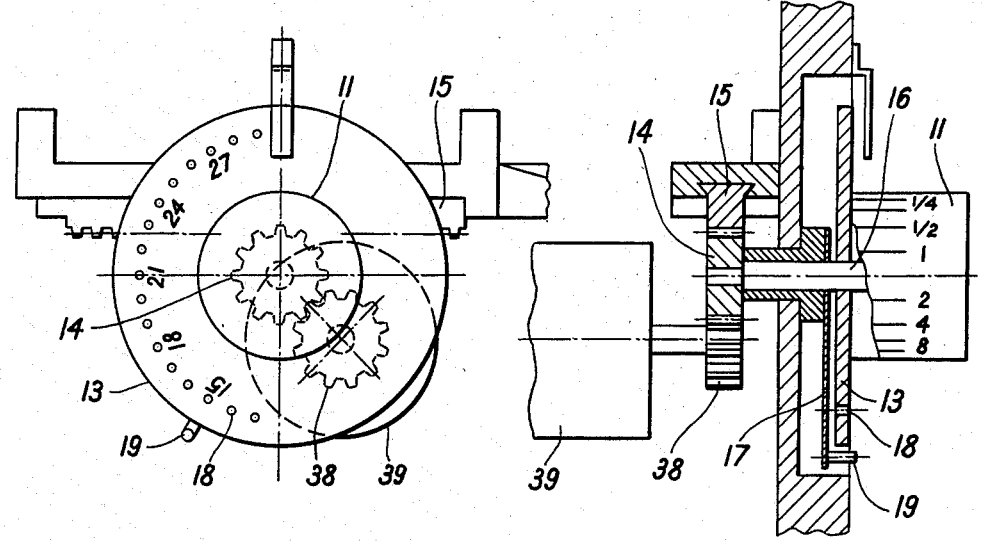
FIG. 3 is an elevation of the time-setting portion thereof.
FIG. 4 is an end view in axial cross-section of the device shown in FIG. 3.
Figure 2:
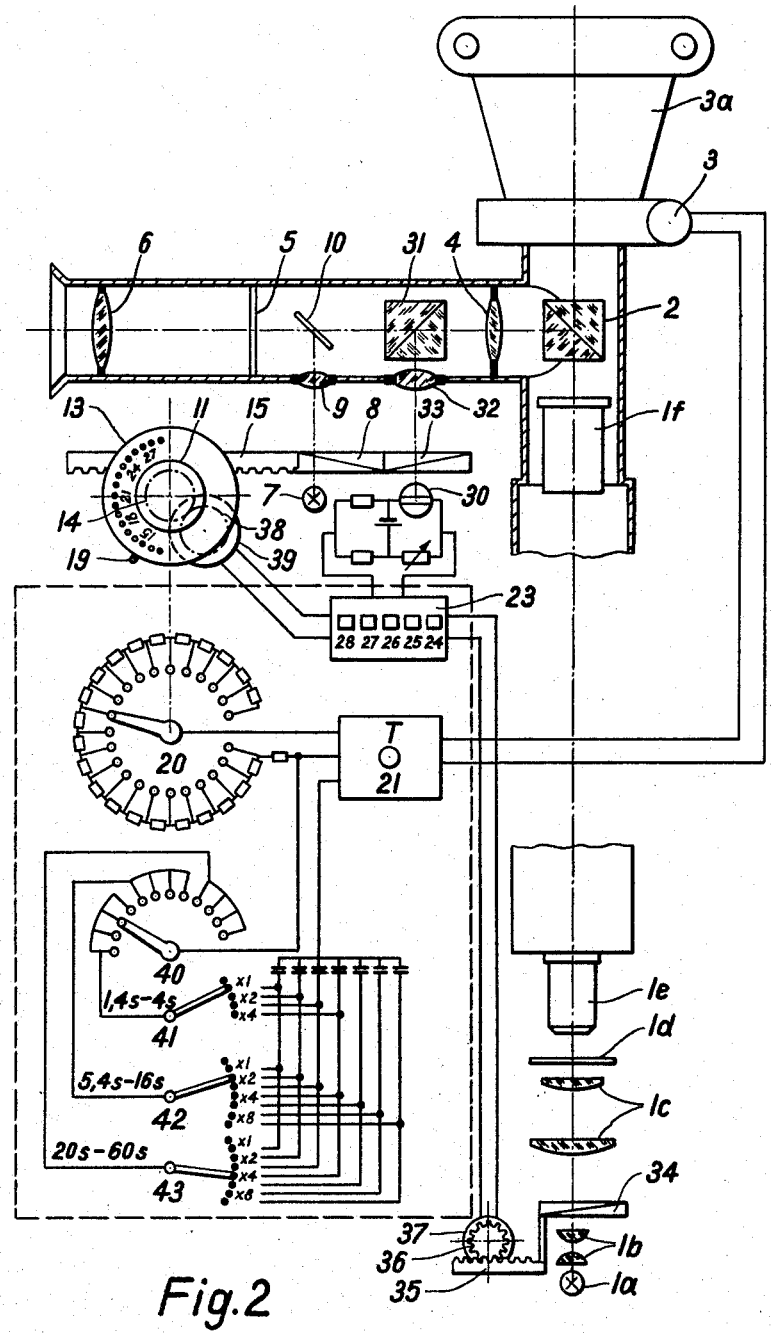
FIG. 2 illustrates diagrammatically a practical embodiment thereof, including electric circuitry.

A practical example of the present invention is shown in FIGS. 2–4.

Behind the microscope, which includes a light source 1a, collector 1b, condenser 1c, the object 1d, objective 1e and an eyepiece 1f, the ray path is split through a part-transparent prism 2; one part comes through an electromagnetic shutter 3 to a camera 3a, another through a lens 4 to a part-transparent prism 31, which splits the ray path once more; one part goes via a lens 32 and a grey wedge 33 to a photo-resistance 30, the other part goes to a photometer viewer, which will be described later. The grey wedge 33 is connected via a toothed rack 15 and toothed wheels 14 and 38 with a servo motor 39. In the illumination ray path lies a grey wedge 34 which is connected with a servo motor 37 via a toothed rack 35 and a toothed wheel 36.

The photo resistance 30 is connected in a bridge circuit, with a control gear 23 in place of the galvanometer. Upon pressing and holding down a starting key 26 a positive or negative deflection of the bridge from the zero point moves a polarised sensitive relay, which places an equal positive or negative voltage on the motor 37 or—respectively after operation of the start keys 24 and 25—on the motor 39. The motor moves the grey wedge 33 or 34 respectively until the deflection of the bridge has vanished, i.e. until a predetermined illumination strength is manifest on the photo-resistance 30.

The time switch 20 of the electronic timing device 21 is connected with the toothed wheel 14. The grey wedge 33, the toothed wheel 14 and the resistances of the time switch 20 are so dimensioned that the quotient of the respectively effected transmission of the grey wedge 33 and the exposure time set in is constant. Therefore as said above, upon reaching the bridge zero point the product of the exposure time set in and the illumination strength on the film plane of the camera is constant. In case the motor 39 works on pressing the key 25, the optimum exposure time is set in with the illumination intensity held constant. If on the contrary by pressing the key 24 it is switched onto the motor 37, then an exposure time can be chosen, after which the motor 37 adjusts the grey wedge 34 until the optimum illumination intensity matched thereto is set in.

The film sensitivity can be taken into account by alteration of the coupling between the grey wedge 33 and the time switch 20 (cf. FIGS. 3 and 4): the motion transmission from a time-setting knob 11 to the toothed wheel 14 and the toothed rack 15 occurs through a leaf spring 17, which is joined with the rotatable toothed wheel 14 carried fast on a shaft 16 and rests with the stylus 18 in holes of the disc 13 fast secured to the time switch. The time setting knob 11 is joined to the electric time switch via the shaft 16. The coupling between the electric time switch and grey wedge can therefore be altered by alteration of the rest position of the stylus 18 from one hole to another. The placing of the stylus 18 is shown by a knob 19 upon pressing of which the stylus 18 is released. The knob 19 is placed against the desired film speed readable on a scale on disc 13.

The switch group 41, 42 and 43 is connected parallel to the time switch 20 for the setting in of extension factors (DIN—units, $\sqrt[3]{2}$). Because these factors are not dependent only upon the film currently in use, but also vary with the length of the exposure time, the times from 1–60 seconds are divided into three ranges, so that on the switch 41 the factors 1.4–4 seconds can be chosen, on the switch 42, 5.6–16 seconds, and on the switch 43, 20–60 seconds. With the operation of the time switch 20 switches in a switch 40 lying in the second plane switches in, in order, first the switch 41, then 42 and finally 43 and effects thereby not only an alteration of resistance R of the RC member of the electronic timing device 21, but also a switching in of auxiliary condensers of the switch group 41–43. For example, using a given colour film the instructions require; expose 20 seconds instead of 10 seconds, 4 minutes instead of 1 minute; therefore through choice of the factor 2 on switch 42 (5.6–16 seconds) and the factor 4 on switch 43 (20–60 seconds) this instruction is fulfilled by the automatic mechanism.

In cases in which the integral exposure value seems unsuitable, individual objects can separately be visually photometered.

By release of the start key 26 the automatic mechanism is switched off. The motors 37 resp. 39 now receive positive current via the key 27 resp. negative current via the key 28. The grey wedges 8 (and 33) resp. 34 can now be moved out by hand by pressing the key 27 or 28. Their setting results with the aid of the photometer viewing tube in the following manner:

The lens 4 casts a picture on the matt disc 5 which can be observed through a lens 6. A lamp 7 illuminates, via the grey wedge 8 and a lens 9, the little mirror 10, which lies close in front of the matt disc 5. The mirror 10 on the one hand shadows the light coming from the microscope and on the other hand casts the light coming from the lamp 7 on to the matt disc 5 and produces therefore a small photometric comparison field. The exit pupils both of the picture ray path and also of the comparison ray path become, through the matt disc 5, bigger than the pupils of the human eye, so that the latter shuts out of the two large exit pupils two small exit pupils simultaneously illuminated and fitting one another exactly. Thereby is made possible an exact photometric comparison without the necessity of bringing the two exit pupils to fit one another by adjustment.

We claim:

1. A photomicrographic apparatus comprising in combination, an electromagnetic shutter, an electric timing device arranged to control opening and closing of said shutter to define exposure time, a time switch in said timing device, a light source, a light-sensitive element, two adjustable light-weakening devices, a servo-mechanism coupled to at least one of said light weakening devices for adjustment thereof, camera means for supporting a photo-sensitive medium in fixed relation to an optical path through the apparatus, an objective arranged in said path to form an image on said medium, and optical means arranged to divert a proportion of light in said path away from said camera means towards said light-sensitive element, one of said light-weakening devices being placed in the optical path between said light source and said optical means, the other of said light-weakening devices being placed in the path of light passing between said optical means and said light-sensitive element and so coupled to the time switch that at any instant the time set thereon is directly proportional to the light transmission factor of said other light-weakening device, and the servo-mechanism being arranged to adjust either of the light-weakening devices at choice, while the other is held fast, until a predetermined illumination of the light-sensitive element is attained.

2. A photomicrographic apparatus comprising in combination, an electromagnetic shutter, an electric timing device arranged to control opening and closing of said shutter to define exposure time, a time switch in said timing device, a light source, a light-sensitive element, an electric bridge circuit connected to said light-sensitive element so as to be balanced only the latter is subjected to a predetermined illumination, two adjustable light-weakening devices, a servo-mechanism under control of said bridge circuit and coupled to at least one of said light weakening devices for adjustment thereof, camera means for supporting a photosensitive medium in fixed relation to an optical path through the apparatus, an objective arranged in said path to form an image on said medium, and optical means arranged to divert a proportion of light in said path away from said camera means towards said light-sensitive element, one of said light-weakening devices being placed in the optical path between said light source and said optical means, the other of said light-weakening devices being placed in the path of light passing between said optical means and said light-sensitive element and so coupled to the time switch that at any instant the time set thereon is directly proportional to the light transmission factor of said other light-weakening device, and the servo mechanism being arranged to adjust either of the light-weakening devices at choice, while the other is held fast whenever said bridge circuit is unbalanced to restore the balance thereof by return of the illumination of the light-sensitive element to the predetermined value.

3. A photomicrographic apparatus comprising in combination, an electromagnetic shutter, an electric timing device arranged to control opening and closing of said shutter to define exposure time, a time switch in said timing device, a light source, a light-sensitive element, an electric bridge circuit connected to said light-sensitive element so as to be balanced only the latter is subjected to a predetermined illumination, two adjustable light-weakening devices, a servo-mechanism under control of said bridge circuit and coupled to at least one of said light weakening devices for adjustment thereof, camera means for supporting a photo-sensitive medium in fixed relation to an optical path through the apparatus, an objective arranged in said path to form an image on said medium, and optical means arranged to divert a proportion of light in said path away from said camera means towards said light-sensitive element, one of said light-weakening devices being placed in the optical path between said light source and said optical means, the other of said light-weakening devices being placed in the path of light passing between said optical means and said light-sensitive element and so coupled to the time switch that at any instant the time set thereon is directly proportional to the light transmission factor of said other light-weakening device, the balance point of the bridge circuit being adjustable to allow for constants such as film sensitivity and the servo-mechanism being arranged to adjust either of the light-weakening devices at choice, while the other is held fast, whenever said bridge circuit is unbalanced to restore the balance thereof by return of the illumination of the light-sensitive element to the predetermined value.

4. A photomicrographic apparatus comprising in combination, an electromagnetic shutter, an electric timing device arranged to control opening and closing of said shutter to define exposure time, a time switch in said timing device, a light source, a light-sensitive element, three adjustable light-weakening devices, a servo-mechanism coupled to at least one of said light-weakening devices for adjustment thereof, camera means for supporting a photo-sensitive medium in fixed relation to an optical path through the apparatus, an objective arranged in said path to form an image on said medium, and optical means arranged to divert a proportion of light in said path away from said camera means towards said light-sensitive element, the first of said light-weakening devices being placed in the optical path between said light source and said optical means, the second of said light weakening devices being placed in the path of light passing between said optical means and said light-sensitive element and so coupled to the time switch that any instant the time set thereon is directly proportional to the light transmission factor of said second light-weakening device, the third of said light-weakening devices being placed before the light-sensitive element and the servo-mechanism being arranged to adjust either of the first and second of the light-weakening devices at choice, while the other is held fast, until a predetermined illumination of the light-sensitive element is attained.

5. A photomicrographic apparatus comprising in combination, an electromagnetic shutter, an electric timing device arranged to control opening and closing of said shutter to define exposure time, a time switch in said timing device, a light source, a light-sensitive element, two adjustable light-weakening devices, a servo-mechanism coupled to at least one of said light-weakening devices for adjustment thereof, camera means for supporting a photosensitive medium in fixed relation to an optical path through the apparatus, an objective arranged in said path to form an image on said medium, and optical means arranged to divert a proportion of light in said path away from said camera means towards said light-sensitive element, one of said light-weakening devices being placed in the optical path between said light source and said optical means, the other of said light-weakening devices being placed in the path of light passing between said optical means and said light-sensitive element and adjustably coupled to the time switch so that adjustment of the coupling permits allowance for constants such as film sensitivity and thereafter at any instant the time set thereon is directly proportional to the light transmission factor of said other light-weakening device, and the servo mechanism being arranged to adjust either of the light-weakening devices at choice, while the other is held fast, until a predetermined illumination of the light-sensitive element is attained.

6. A photomicrographic apparatus comprising in combination, an electromagnetic shutter, an electronic timing device including at least one time-determining RC network and arranged to control opening and closing of said shutter to define exposure time, said RC network being adjustable to allow for constants such as film sensitivity, a time switch in said timing device, a light source, a light sensitive element, two adjustable light-weakening devices, a servo-mechanism coupled to at least one of said light-weakening devices for adjustment thereof, camera means for supporting a photo-sensitive medium in fixed relation to an optical path through the apparatus, an objective arranged in said path to form an image on said medium, and optical means arranged to divert a proportion of light in said path away from said camera means towards said light-sensitive element, one of said light-weakening devices being placed in the optical path between said light source and said optical means, the other of said light-weakening devices being placed in the path of light passing between said optical means and said light-sensitive element and so coupled to the time switch that at any instance the time set thereon is directly proportional to the light transmission factor of said other light-weakening device, and the servo-mechanism being arranged to adjust either of the light weakening devices at choice, while the other is held fast, until a predetermined illumination of the light-sensitive element is attained.

7. A photomicrographic apparatus comprising in combination, an electromagnetic shutter, an electric timing device arranged to control opening and closing of said shutter to define exposure time, a time switch in said timing device, a light source, a light-sensitive element, two adjustable light-weakening devices, a servo-mechanism coupled to at least one of said light-weakening devices for adjustment thereof, camera means for supporting a photo-sensitive medium in fixed relation to an optical path through the apparatus, an objective arranged in said path to form an image on said medium, optical means arranged to divert a proportion of light in said path away from said camera means towards said light-sensitive element, further optical means arranged to divert a further proportion of light from said optical path, an eyepiece arranged to receive said further proportion, path adjustable means for supplying comparison light of controlled intensity to said eyepiece to permit photometric balancing, and a coupling between said adjustable means and the time switch, one of said light-weakening devices being placed in the optical path between said light source and said optical means, the other of said light-weakening devices being placed in the path of light passing between said optical means and said light-sensitive element and so coupled to the time switch that at any instant the time set thereon is directly proportional to the light transmission factor of said other light-weakening device, and the servo-mechanism being arranged to adjust either of the light-weakening devices at choice, while the other is held fast, until a predetermined illumination of the light-sensitive element is attained.

8. A photomicrographic apparatus comprising in combination, an electromagnetic shutter, an electric timing device arranged to control opening and closing of said shutter to define exposure time, a time switch in said timing device, a light source, a light-sensitive element, means for adjusting said timing device to allow for extension factors applicable when the exposure time is so long that reciprocity failure is encountered, two adjustable light-weakening devices, a servo-mechanism coupled to at least one of said light-weakening devices for adjustment thereof, camera means for supporting a photo-sensitive medium in fixed relation to an optical path through the apparatus, an objective arranged in said path to form an image on said medium, and optical means arranged to divert a proportion of light in said path away from said camera means towards said light-sensitive element, one of said light-weakening devices being placed in the optical path between said light source and said optical means, the other of said light-weakening devices being placed in the path of light passing between said optical means and said light-sensitive element and so coupled to the time switch that at any instant the time set thereon is directly proportional to the light transmission factor of said other light-weakening device, and the servo-mechanism being arranged to adjust either of the light-weakening devices at choice, while the other is held fast, until a predetermined illumination of the light-sensitive element is attained.

No references cited.